United States Patent
Miyamori et al.

(10) Patent No.: US 11,177,756 B2
(45) Date of Patent: Nov. 16, 2021

(54) ELECTRIC MOTOR DRIVE DEVICE AND AIR CONDITIONER

(71) Applicant: Mitsubishi Electric Corporation, Tokyo (JP)

(72) Inventors: Shun Miyamori, Tokyo (JP); Shinichiro Ura, Tokyo (JP); Keiichiro Shizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/955,266

(22) PCT Filed: Mar. 8, 2018

(86) PCT No.: PCT/JP2018/009060
§ 371 (c)(1),
(2) Date: Jun. 18, 2020

(87) PCT Pub. No.: WO2019/171549
PCT Pub. Date: Sep. 12, 2019

(65) Prior Publication Data
US 2021/0226569 A1    Jul. 22, 2021

(51) Int. Cl.
*H02P 25/18*       (2006.01)
*H02P 27/06*       (2006.01)
*H02P 29/032*      (2016.01)
*H02P 29/024*      (2016.01)

(52) U.S. Cl.
CPC ............ *H02P 25/184* (2013.01); *H02P 27/06* (2013.01); *H02P 29/027* (2013.01); *H02P 29/032* (2016.02)

(58) Field of Classification Search
CPC .......... H02P 1/32; H02P 25/184; H02P 27/06; H02P 25/18
See application file for complete search history.

(56) References Cited

U.S. PATENT DOCUMENTS 8,890,540 B2 *  11/2014  Li ..................... G01R 31/1227
                                                   324/555
8,981,696 B2 *   3/2015  Bates ........................ H02P 1/04
                                                   318/432
9,024,563 B2 *   5/2015  Bunte .................... H02P 29/02
                                                   318/503
(Continued)

FOREIGN PATENT DOCUMENTS

EP    0 528 102 A2    2/1993
EP    0528102 A2 *    2/1993   .......... H02M 7/5387
(Continued)

OTHER PUBLICATIONS

Extended European Search Report dated Jan. 29, 2021, issued in corresponding European Patent Application 18908336.3.

*Primary Examiner* — Thai T Dinh
(74) *Attorney, Agent, or Firm* — Posz Law Group, PLC

(57) ABSTRACT

An electric motor drive device includes a wire-connected-state switching unit to switch a wire connected state of stator windings of an electric motor to either a delta connected state or a star connected state, an inverter to drive the electric motor, and a relay-voltage detection circuit to detect a relay voltage (VR) that is a power-supply voltage of the wire-connected-state switching unit, and to deactivate the inverter when the relay voltage (VR) is decreased below a threshold.

8 Claims, 7 Drawing Sheets

(56) References Cited

U.S. PATENT DOCUMENTS

| | | | |
|---|---|---|---|
| 9,120,647 B2* | 9/2015 | Liang | B66B 25/003 |
| 2004/0217723 A1* | 11/2004 | Cai | F02N 11/0866 |
| | | | 318/268 |
| 2012/0038309 A1 | 2/2012 | Zahora et al. | |
| 2016/0090189 A1* | 3/2016 | Wangemann | F04D 13/06 |
| | | | 60/698 |
| 2020/0321900 A1* | 10/2020 | Kashima | H02P 25/184 |

FOREIGN PATENT DOCUMENTS

| | | | |
|---|---|---|---|
| JP | 2008-228513 A | | 9/2008 |
| JP | 2008228513 A | * | 9/2008 |
| JP | 2009-216324 A | | 9/2009 |

* cited by examiner

ELECTRIC MOTOR DRIVE DEVICE AND AIR CONDITIONER

CROSS REFERENCE TO RELATED APPLICATION

This application is a U.S. national stage application of PCT/JP2018/009060 filed on Mar. 8, 2018, the contents of which are incorporated herein by reference.

FIELD

The present invention relates to an electric motor drive device that drives an electric motor configured to be capable of switching between wire connected states of stator windings, and also relates to an air conditioner.

BACKGROUND

At a rated condition where the rotational speed of an electric motor per unit time is relatively high, a lower counter-electromotive force is generated in the electric motor in a delta connected state, which is a wire connected state of stator windings, as compared to a star connected state. Therefore, it is possible to operate the electric motor at a higher rotational speed than that in the star connected state. In contrast, a higher counter-electromotive force is generated in the electric motor in the star connected state as compared to the delta connected state. Thus, the rotational speed of the electric motor in the star connected state cannot become as high as that in the delta connected state.

At an intermediate condition where the rotational speed of an electric motor per unit time is lower than the rated condition, a higher current flows through the electric motor in the delta connected state as compared to the star connected state, which results in greater power loss. In contrast, a lower current flows through the electric motor in the star connected state as compared to the delta connected state, which results in lower power loss.

A conventional electric motor drive device that drives an electric motor configured to be capable of switching the wire connected state of stator windings between a star connected state and a delta connected state includes an inverter and a relay for switching between wire connected states (for example, see Patent Literature 1). The conventional electric motor drive device operates the electric motor in the delta connected state under a high-load condition where the rotational speed of the electric motor is relatively high, while operating the electric motor in the star connected state under a low-load condition where the rotational speed of the electric motor is lower than that under a high-load condition. Due to this configuration, the conventional electric motor drive device operates the electric motor at a relatively high rotational speed under a high-load condition, while operating the electric motor efficiently with lower power loss under a low-load condition.

CITATION LIST

Patent Literature

Patent Literature 1: Japanese Patent Application Laid-open No. 2009-216324

SUMMARY

Technical Problem

As described above, under a high-load condition, the conventional electric motor drive device operates the electric motor in the delta connected state, while operating the electric motor in the star connected state under a low-load condition. In this case, the value of current flowing through the electric motor, at which magnets of the electric motor can possibly become demagnetized, differs between the star connected state and the delta connected state. It is thus necessary to execute a control to interrupt an overcurrent by using different current values between the star connected state and the delta connected state.

In general, the value of current flowing through an electric motor in the star connected state, at which magnets of the electric motor can possibly become demagnetized, is smaller than the value of current flowing through the electric motor in the delta connected state, at which the magnets of the electric motor can possibly become demagnetized. For this reason, the current value to be used for the control to interrupt an overcurrent in the star connected state (hereinafter, "overcurrent interruption value for the star connected state") needs to be set smaller as compared to the current value to be used for the control to interrupt an overcurrent in the delta connected state (hereinafter, "overcurrent interruption value for the delta connected state").

There is a configuration in which a power supply of the inverter, and a power supply of the relay for switching between wire connected states are generated from a common AC power supply, and when the relay is turned on, the wire connected state of the stator windings is switched to the delta connected state, and when the relay is turned off, the wire connected state of the stator windings is switched to the star connected state. In this configuration, when the power-supply voltage of the inverter is decreased due to an unexpected voltage decrease in the AC power supply or the like in the delta connected state, the power-supply voltage of the relay is decreased accordingly, and then the relay may not be kept on, that is, the delta connected state may not be maintained. In this case, even when the relay is turned off and thus the wire connected state is switched to the star connected state, the inverter still supplies the electric motor with a current equal to the current to be supplied to the electric motor in the delta connected state. Further, the control to interrupt an overcurrent in the delta connected state, that is, the control to interrupt an overcurrent using the overcurrent interruption value for the delta connected state, which is larger than the overcurrent interruption value for the star connected state, is executed. Due to this control, there is a possibility that the value of current to be supplied to the electric motor may exceed the overcurrent interruption value for the star connected state. This leads to a problem that the magnets of the electric motor can possibly become demagnetized.

The present invention has been made in view of the above problems, and an object of the present invention is to provide an electric motor drive device that can prevent magnets of an electric motor from becoming demagnetized even when a power-supply voltage is decreased due to an unexpected voltage decrease or the like.

Solution to Problem

In order to solve the above-described problem and achieve the object, an electric motor drive device according to the present invention includes: a switching unit to switch a wire connected state of stator windings of an electric motor to either a first wire connected state or a second wire connected state; an inverter unit to drive the electric motor; and a power-supply voltage detection unit to detect a first power-supply voltage that is a power-supply voltage of the switching unit, and to deactivate the inverter unit when the first power-supply voltage is decreased below a threshold.

Advantageous Effects of Invention

The electric motor drive device according to the present invention has an effect where it is possible to prevent magnets of an electric motor from becoming demagnetized even when a power-supply voltage is decreased due to an unexpected voltage decrease or the like.

DESCRIPTION OF EMBODIMENTS

An electric motor drive device and an air conditioner according to embodiments of the present invention will be described in detail below with reference to the accompanying drawings. The present invention is not limited to the embodiments.

First Embodiment

Figure 1:
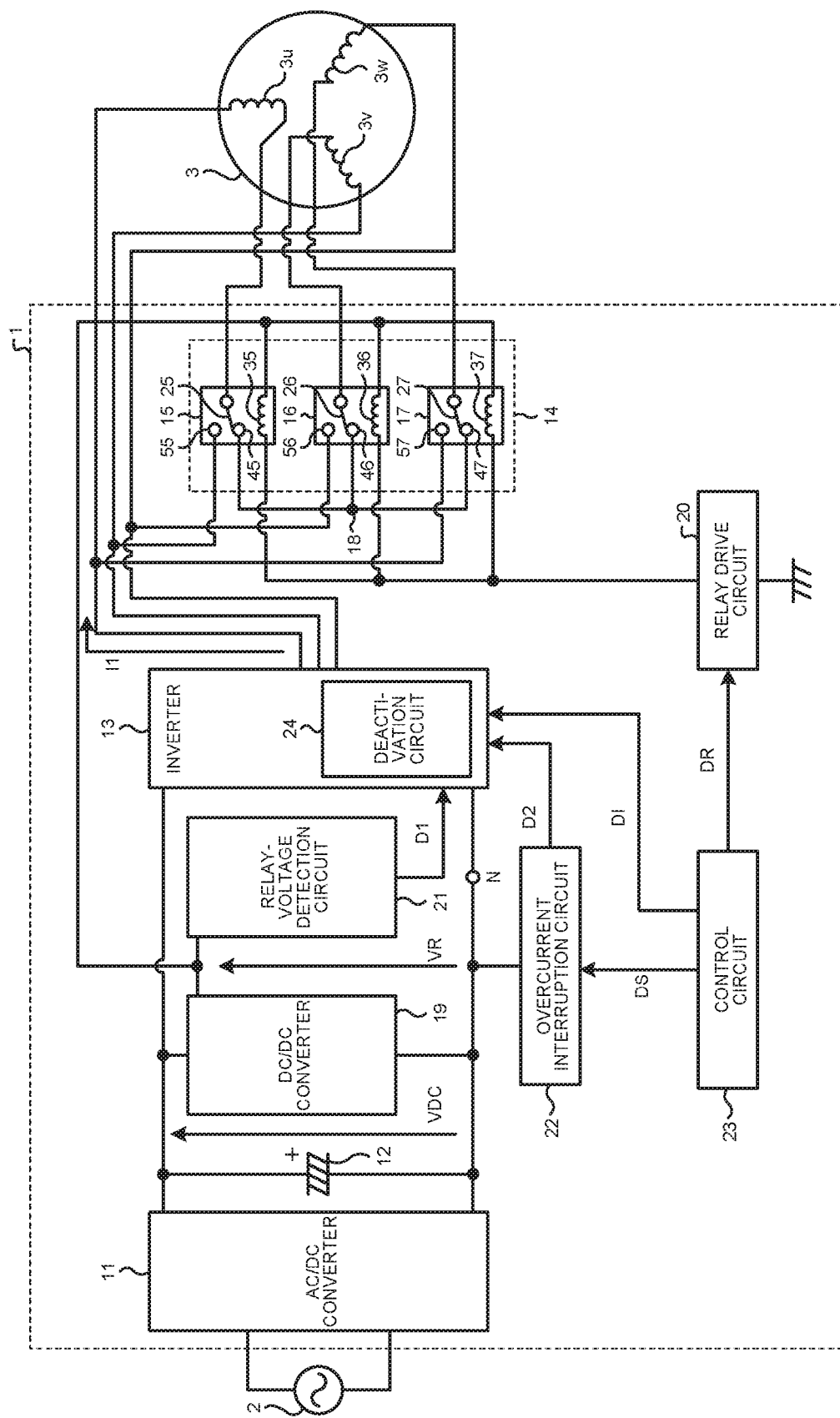
FIG. 1 is a diagram illustrating a configuration example of an electric motor drive device according to a first embodiment of the present invention.

First, an electric motor drive device according to a first embodiment of the present invention is described below. FIG. 1 is a diagram illustrating a configuration example of the electric motor drive device according to the first embodiment of the present invention. An electric motor drive device 1 according to the present embodiment illustrated in FIG. 1 generates power from AC power supplied from an AC power supply 2 to be used for driving an electric motor 3.

The electric motor drive device 1 according to the present embodiment illustrated in FIG. 1 includes an AC (Alternating Current)/DC (Direct Current) converter 11, a smoothing capacitor 12, an inverter 13, a wire-connected-state switching unit 14, a DC/DC converter 19, a relay drive circuit 20, a relay-voltage detection circuit 21, an overcurrent interruption circuit 22, and a control circuit 23. The AC power supply 2 is connected to the input of the AC/DC converter 11. The electric motor 3 is connected to the output of the inverter 13. The electric motor 3 is a permanent-magnet synchronous electric motor in which a rotor includes permanent magnets. The electric motor 3 is driven by being supplied with three-phase AC power from the inverter 13.

The AC/DC converter 11 converts AC power supplied from the AC power supply 2 to DC power. The AC/DC converter 11 corresponds to a first voltage conversion unit. The smoothing capacitor 12 smooths a DC voltage supplied from the AC/DC converter 11 into a steady DC voltage (hereinafter, "smoothing-capacitor voltage VDC"). The smoothing-capacitor voltage VDC is a power-supply voltage of the inverter 13. The inverter 13 converts the smoothing-capacitor voltage VDC to an AC voltage by pulse width modulation, and applies the AC voltage to the electric motor 3 to be driven. The inverter 13 includes a deactivation circuit 24 that deactivates the inverter 13. The inverter 13 corresponds to an inverter unit. The electric motor 3 is configured to bring three stator windings $3u$, $3v$, and $3w$ into an open state at opposite ends, and be capable of changing the wire connected state.

The wire-connected-state switching unit 14 includes relays 15, 16, and 17 to switch the wire connected state of the stator windings $3u$, $3v$, and $3w$ of the electric motor 3 between a star connected state and a delta connected state. The delta connected state corresponds to a first wire connected state. The star connected state corresponds to a second wire connected state. The wire-connected-state switching unit 14 corresponds to a switching unit. The relays 15, 16, and 17 are C contact relays, each of which includes a contact plate and a coil for operating the contact plate. One terminal of the contact plate is connected to the stator winding, while the other terminal of the contact plate is connected to either a first contact or a second contact. The relay 15 includes a contact plate 25, contacts 45 and 55, and a coil 35. The contact plate 25 is connected to the contact 45 that is the first contact when a current lower than a certain value flows through the coil 35. The contact plate 25 is connected to the contact 55 that is the second contact when a current equal to or higher than the certain value flows through the coil 35. "The relay 15 is turned off" refers to a state in which the contact plate 25 is connected to the contact 45. "The relay 15 is turned on" refers to a state in which the contact plate 25 is connected to the contact 55. Since the configuration of both the relay 16 and the relay 17 is identical to the configuration of the relay 15, descriptions thereof are omitted.

One terminal of each of the three stator windings $3u$, $3v$, and $3w$ of the electric motor 3 is connected to each of three output terminals of the inverter 13. The other terminal thereof is connected to each of contact plates 25, 26, and 27 of the three relays 15, 16, and 17. Contacts 45, 46, and 47 are individually connected to a neutral-point terminal 18. Contacts 55, 56, and 57 are connected respectively to the three output terminals of the inverter 13. The neutral-point terminal 18 is a neutral point when the stator windings $3u$, $3v$, and $3w$ of the electric motor 3 are connected in a star. When the contact plate 25 is connected to the contact 45, the contact plate 26 is connected to the contact 46, and the contact plate 27 is connected to the contact 47, then the stator windings $3u$, $3v$, and $3w$ of the electric motor 3 are connected in a star. In contrast, when the contact plate 25 is connected to the contact 55, the contact plate 26 is connected to the contact 56, and the contact plate 27 is connected to the contact 57, then the stator windings $3u$, $3v$, and $3w$ of the electric motor 3 are connected in a delta. FIG. 1 illustrates the star connected state.

The DC/DC converter 19 converts the smoothing-capacitor voltage VDC to a different voltage level, and applies the voltage converted to a different voltage level (hereinafter, "relay voltage VR") to the coils 35, 36, and 37 included respectively in the relays 15, 16, and 17. The relay voltage VR is a power-supply voltage of the wire-connected-state switching unit 14, and corresponds to a first power-supply voltage. The DC/DC converter 19 corresponds to a second voltage conversion unit. The relay drive circuit 20 includes a switch, and performs opening/closing operation on the switch in accordance with a relay drive signal DR received from the control circuit 23. When the switch of the relay drive circuit 20 is closed, a current flows through the coils 35, 36, and 37 of the relays 15, 16, and 17.

Figure 2:
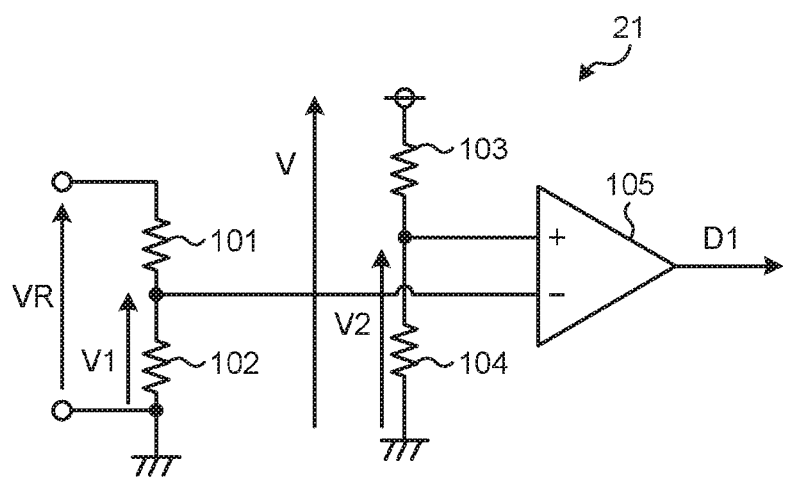
FIG. 2 is a diagram illustrating a configuration example of a relay-voltage detection circuit illustrated in FIG. 1.

The relay-voltage detection circuit 21 is connected to the output of the DC/DC converter 19. The relay-voltage detection circuit 21 detects the relay voltage VR. When the value of the relay voltage VR is decreased below a predetermined threshold C, the relay-voltage detection circuit 21 transmits the deactivation circuit 24 a deactivation signal D1 for deactivating the inverter 13. The threshold C is set to a voltage value that is slightly larger than the value of the relay voltage VR at which the relays 15, 16, and 17 cannot be kept on. The value of the relay voltage VR, at which the relays 15, 16, and 17 cannot be kept on, corresponds to a first value. The relay-voltage detection circuit 21 corresponds to a power-supply voltage detection unit. FIG. 2 is a diagram illustrating a configuration example of the relay-voltage detection circuit illustrated in FIG. 1. The relay-voltage detection circuit 21 illustrated in FIG. 2 includes resistances 101, 102, 103, and 104, and a comparator 105. The relay-voltage detection circuit 21 divides the relay voltage VR by the resistance 101 and the resistance 102 into a voltage V1, and inputs the voltage V1 to a negative terminal of the comparator 105. For example, the relay-voltage detection circuit 21 divides a voltage V, which is separate from the relay voltage VR generated by the DC/DC converter 19, by the resistance 103 and the resistance 104 to generate a reference voltage V2, and inputs the reference voltage V2 to a positive terminal of the comparator 105. The relay-voltage detection circuit 21 configured as described above transmits a Hi signal as the deactivation signal D1 to the deactivation circuit 24 when the value of the relay voltage VR is decreased below the threshold C.

Referring back to FIG. 1, the overcurrent interruption circuit 22 is connected by being branched off from a point N between the AC/DC converter 11 and the inverter 13. On the basis of a current I1 flowing through the inverter 13, when an overcurrent flows through the stator windings 3u, 3v, and 3w of the electric motor 3, the overcurrent interruption circuit 22 detects this overcurrent to discontinue the state in which an overcurrent flows through the stator windings 3u, 3v, and 3w of the electric motor 3. In order to protect the electric motor 3, the overcurrent interruption circuit 22 prevents the permanent magnets constituting the rotor from being demagnetized due to a continuous flow of overcurrent that exceeds a predetermined value through the stator windings 3u, 3v, and 3w of the electric motor 3. The overcurrent interruption circuit 22 executes a control to interrupt an overcurrent by using different current values between the star connected state and the delta connected state. In general, the current value, at which the magnets of the electric motor 3 in the star connected state can possibly become demagnetized, is smaller than the current value at which the magnets of the electric motor 3 in the delta connected state can possibly become demagnetized. An overcurrent interruption value IS1 for the star connected state is set smaller as compared to an overcurrent interruption value IS2 for the delta connected state. The overcurrent interruption value IS2 corresponds to a first interruption value. The overcurrent interruption value IS1 corresponds to a second interruption value. On the basis of a current flowing through the inverter 13, when the overcurrent interruption circuit 22 detects a flow of current whose value is larger than the overcurrent interruption value 1S1 or the overcurrent interruption value IS2 having been held therein, the overcurrent interruption circuit 22 transmits the deactivation circuit 24 a deactivation signal D2 for deactivating the inverter 13.

The control circuit 23 transmits an inverter drive signal DI to the inverter 13 to control each switching element constituting the inverter 13. In order to switch between wire connected states of the stator windings 3u, 3v, and 3w, the control circuit 23 transmits the relay drive signal DR to the relay drive circuit 20 to control on/off of the switch of the relay drive circuit 20. In accordance with the wire connected state of the stator windings 3u, 3v, and 3w, the control circuit 23 transmits the overcurrent interruption circuit 22 an interruption-value switching signal DS for switching between overcurrent interruption values so as to control the switching between overcurrent interruption values which are used by the overcurrent interruption circuit 22 for the control to interrupt an overcurrent.

Figure 3:
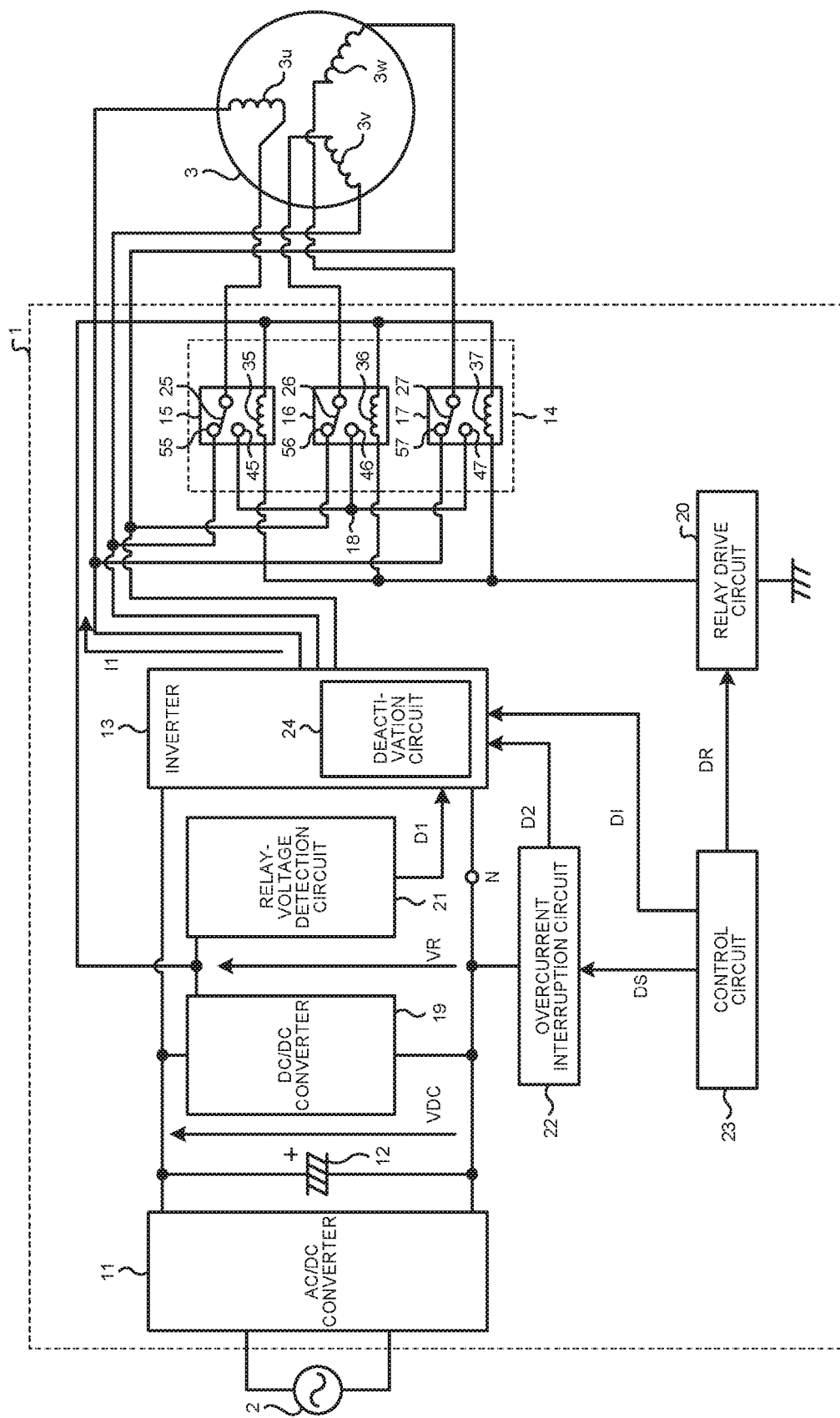
FIG. 3 is an explanatory diagram of a delta connected state in the electric motor drive device according to the first embodiment of the present invention.
Figure 4:
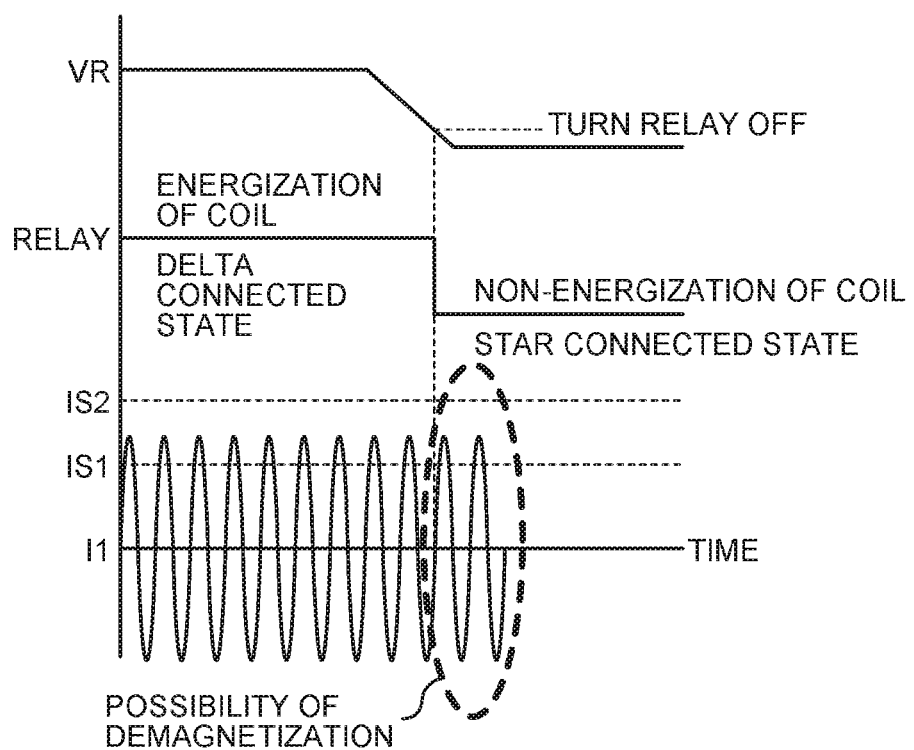
FIG. 4 is an explanatory diagram of a flow of how magnets in an electric motor illustrated in FIG. 1 become demagnetized.

FIG. 3 is an explanatory diagram of the delta connected state in the electric motor drive device according to the first embodiment of the present invention. FIG. 4 is an explanatory diagram of a flow of how the magnets in the electric motor illustrated in FIG. 1 become demagnetized. In the delta connected state illustrated in FIG. 3, when the smoothing-capacitor voltage VDC is decreased due to a voltage decrease in the AC power supply 2, the relay voltage VR is decreased accordingly, and a current whose value is lower than a certain value flows through the coils 35, 36, and 37. Consequently, the relays 15, 16, and 17 may not be kept on, that is, the delta connected state may not be maintained. In this case, even when the relays 15, 16, and 17 are turned off and thus the wire connected state is switched to the star connected state, the inverter 13 still continuously supplies the electric motor 3 with a current that is supposed to be supplied in the delta connected state. Further, the overcurrent interruption circuit 22 executes a control to interrupt an overcurrent by using the overcurrent interruption value IS2 for the delta connected state. Assuming that the control circuit 23 can identify the present wire connected state, it is possible to transmit the interruption-value switching signal DS for switching between overcurrent interruption values from the control circuit 23 to the overcurrent interruption circuit 22. However, when the wire connected state is switched from the delta connected state to the star connected state due to an unexpected voltage decrease in the AC power supply 2, the control circuit 23 cannot identify this switching to the star connected state. As a result, the overcurrent interruption circuit 22 still holds therein the overcurrent interruption value IS2 for the delta connected state. Due to this operation, as illustrated in FIG. 4, there is a possibility that the value of the current I1 to be supplied to the electric motor 3 may exceed the overcurrent interruption value IS1 for the star connected state. Thus, the magnets of the electric motor 3 can possibly become demagnetized.

In the present embodiment, the electric motor drive device 1 performs a process of detecting a decrease in the relay voltage and deactivating the inverter in the manner as described later, so that the magnets of the electric motor 3 can be prevented from becoming demagnetized even in a case where the power-supply voltage is decreased due to an unexpected voltage decrease.

Figure 5:
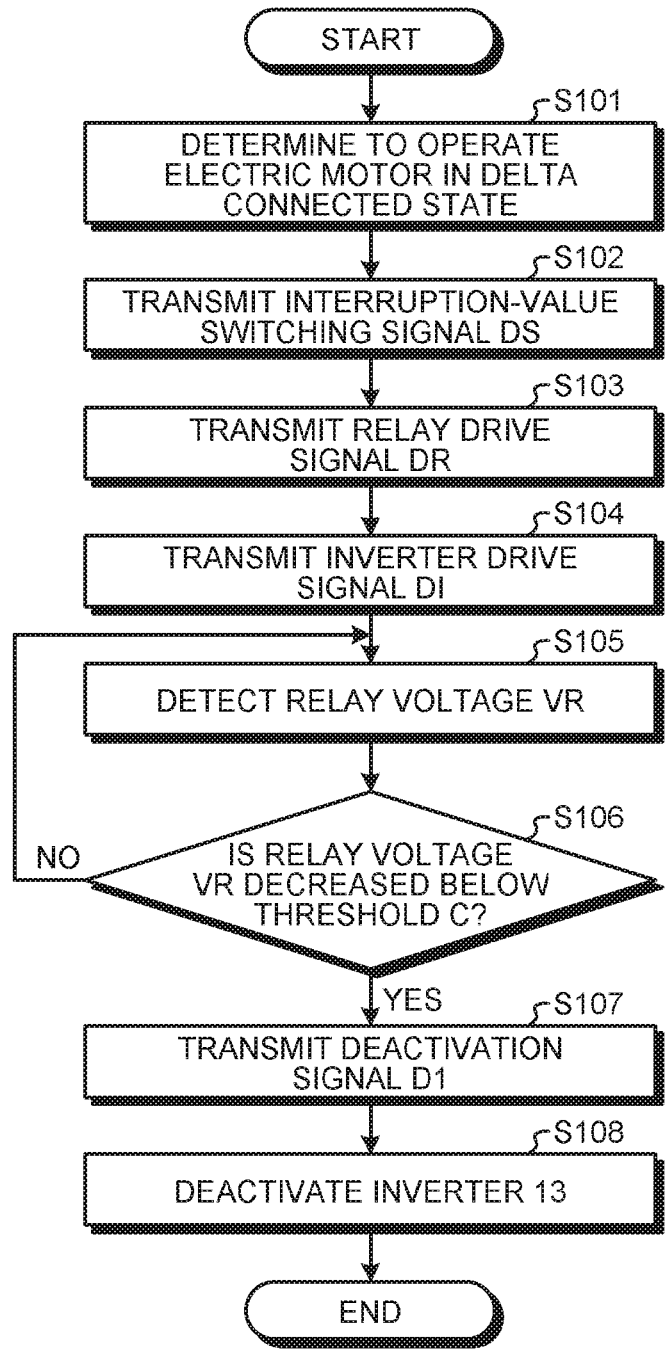
FIG. 5 is a flowchart of a process of detecting a decrease in a relay voltage and deactivating an inverter, which is performed by the electric motor drive device illustrated in FIG. 1.
Figure 6:
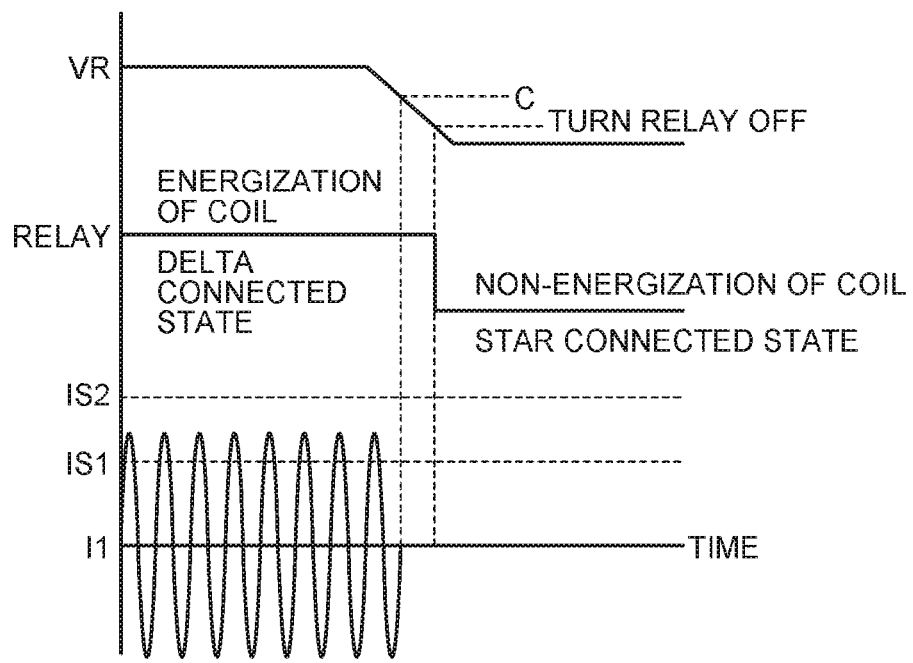
FIG. 6 is an explanatory diagram of a flow of how magnets in the electric motor illustrated in FIG. 1 are prevented from becoming demagnetized.

FIG. 5 is a flowchart of the process of detecting a decrease in the relay voltage and deactivating the inverter, which is performed by the electric motor drive device illustrated in FIG. 1. FIG. 6 is an explanatory diagram of a flow of how the magnets in the electric motor illustrated in FIG. 1 are prevented from becoming demagnetized.

First, the control circuit 23 determines to operate the electric motor 3 in the delta connected state (Step S101).

Thereafter, the control circuit 23 transmits the overcurrent interruption circuit 22 the interruption-value switching signal DS for switching the overcurrent interruption value held in the overcurrent interruption circuit 22 to the overcurrent interruption value IS2 for the delta connected state (Step S102). The overcurrent interruption circuit 22, having received the interruption-value switching signal DS transmitted at Step S102, holds therein the overcurrent interruption value IS2 for the delta connected state as an overcurrent interruption value.

Subsequently, the control circuit 23 transmits the relay drive circuit 20 the relay drive signal DR for switching the wire connected state of the stator windings 3u, 3v, and 3w to the delta connected state (Step S103). The relay drive circuit 20, having received the relay drive signal DR transmitted at Step S103, closes the switch to bring the coils 35, 36, and 37 of the relays 15, 16, and 17 into an energized state to turn the relays 15, 16, and 17 on.

Thereafter, the control circuit 23 transmits the inverter drive signal DI to the inverter 13 (Step S104). The inverter 13, having received the inverter drive signal DI transmitted at Step S104, controls each switching element in accordance with the inverter drive signal DI.

Subsequently, the relay-voltage detection circuit 21 detects the relay voltage VR (Step S105) and determines whether the relay voltage VR is decreased below the predetermined threshold C (Step S106).

When the result of the determination at Step S106 shows that the relay voltage VR is not decreased below the threshold C (NO at Step S106), the relay-voltage detection circuit 21 returns to Step S105.

When the result of the determination at Step S106 shows that the relay voltage VR is decreased below the threshold C (YES at Step S106), the relay-voltage detection circuit 21 transmits the deactivation signal D1 to the deactivation circuit 24 (Step S107). The deactivation circuit 24, having received the deactivation signal D1 transmitted at Step S107, deactivates the inverter 13 (Step S108).

In accordance with the process illustrated in FIG. 5, the inverter 13 is deactivated before the wire connected state is switched from the delta connected state to the star connected state due to an unexpected voltage decrease in the AC power supply 2, such that the electric motor 3 is not supplied with a current as illustrated in FIG. 6. This can prevent the magnets of the electric motor 3 from becoming demagnetized even when the power-supply voltage is decreased due to an unexpected voltage decrease.

Figure 7:
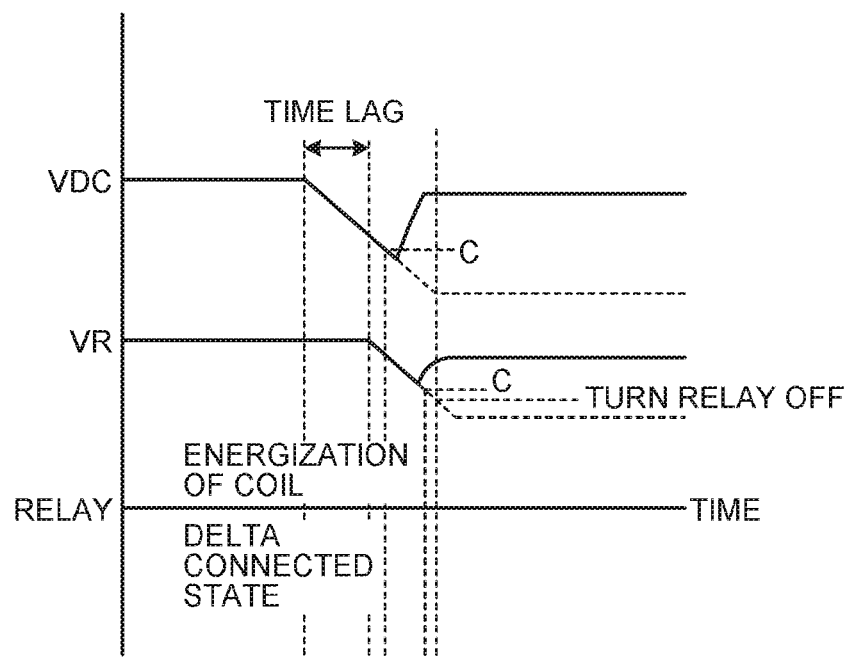
FIG. 7 is an explanatory diagram of a time lag between a smoothing-capacitor voltage and a relay voltage in the electric motor drive device illustrated in FIG. 1.

FIG. 7 is an explanatory diagram of a time lag between a smoothing-capacitor voltage and a relay voltage in the electric motor drive device illustrated in FIG. 1. According to the present embodiment, the relay voltage VR is detected, and then whether the relay voltage VR is decreased below the threshold C is determined to deactivate the inverter 13. The relay voltage VR is generated by the DC/DC converter 19 converting the smoothing-capacitor voltage VDC to a different voltage level. As illustrated in FIG. 7, even when the smoothing-capacitor voltage VDC is decreased due to a voltage decrease in the AC power supply 2 or the like, the relay voltage VR is not immediately decreased because the relay voltage VR is generated through the DC/DC converter 19 from the smoothing-capacitor voltage VDC. That is, there is a time lag in the voltage decrease between the smoothing-capacitor voltage VDC and the relay voltage VR. Thus, the relay voltage VR is not immediately decreased as compared to the smoothing-capacitor voltage VDC. According to the present embodiment, the relay voltage VR is set as a detected target. Thus, as compared to the case where the smoothing-capacitor voltage VDC is set as a detected target and uses the same threshold C, the inverter 13 is less likely to be unnecessarily deactivated when the AC power supply 2 resumes immediately after a momentary voltage drop or the like.

Second Embodiment

The electric motor drive device according to the first embodiment described above is applicable to an electric motor that operates a compressor or a fan of an air conditioner. In a second embodiment of the present invention, an air conditioner is described below, to which the electric motor drive device described in the first embodiment is applied.

Figure 8:
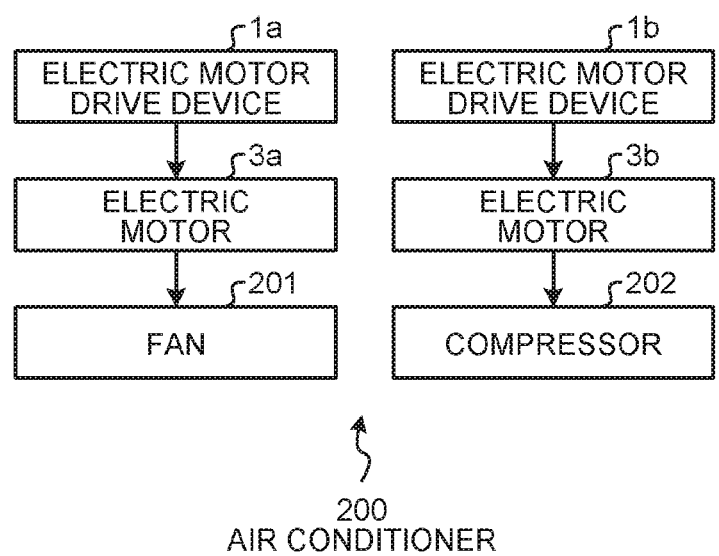
FIG. 8 is a functional block diagram illustrating a configuration of an air conditioner according to a second embodiment of the present invention.

FIG. 8 is a functional block diagram illustrating a configuration of the air conditioner according to the second embodiment of the present invention. An air conditioner 200 illustrated in FIG. 8 includes electric motor drive devices 1a and 1b, an electric motor 3a driven by the electric motor drive device 1a, a fan 201 operated by the electric motor 3a, an electric motor 3b driven by the electric motor drive device 1b, and a compressor 202 operated by the electric motor 3b. The electric motor drive devices 1a and 1b are identical to the electric motor drive device 1 according to the first embodiment, and the electric motors 3a and 3b are identical to the electric motor 3 according to the first embodiment.

The fan 201 is operated by the electric motor 3a to deliver air to a space to be air-conditioned by the air conditioner 200. The compressor 202 is operated by the electric motor 3b to circulate refrigerant through a refrigerant circuit (not illustrated).

While the air conditioner 200 including the electric motor drive device 1a and the electric motor drive device 1b are illustrated in FIG. 8, the present invention is not limited thereto, and it is also possible to configure the air conditioner 200 to include only either one of the electric motor drive device 1a or the electric motor drive device 1b.

The configurations described in the above embodiments are only examples of the content of the present invention. The configurations can be combined with other well-known techniques, and part of each of the configurations can be omitted or modified without departing from the scope of the present invention.

REFERENCE SIGNS LIST 1, 1a, 1b electric motor drive device, 2 AC power supply, 3, 3a, 3b electric motor, 3u, 3v, 3w stator winding, 11 AC/DC converter, 12 smoothing capacitor, 13 inverter, 14 wire-connected-state switching unit, 15, 16, 17 relay, 18 neutral-point terminal, 19 DC/DC converter, 20 relay drive circuit, 21 relay-voltage detection circuit, 22 overcurrent interruption circuit, 23 control circuit, 24 deactivation circuit, 25, 26, 27 contact plate, 35, 36, 37 coil, 45, 46, 47, 55, 56, 57 contact, 101, 102, 103, 104 resistance, 105 comparator, 200 air conditioner, 201 fan, 202 compressor.

The invention claimed is:

1. An electric motor drive device comprising:
a switching circuit to switch a wire connected state of stator windings of an electric motor to either a first wire connected state or a second wire connected state;
an inverter to drive the electric motor; and
a power-supply voltage detection circuit to detect a first power-supply voltage that is a power-supply voltage of the switching circuit, and to deactivate the inverter when the first power-supply voltage is decreased below a threshold,
wherein
the switching circuit switches the wire connected state to the second wire connected state when the first power-supply voltage is lower than a first value, and switches the wire connected state to the first wire connected state when the first power-supply voltage is higher than the first value, and
the threshold is larger than the first value.

2. The electric motor drive device according to claim 1, wherein
the first wire connected state is a delta connected state, and
the second wire connected state is a star connected state.

3. The electric motor drive device according to claim 1, further comprising an overcurrent interruption circuit to deactivate the inverter when a current flowing through the inverter exceeds a first interruption value where the stator windings are in the first wire connected state, and to deactivate the inverter when a current flowing through the inverter exceeds a second interruption value smaller than the first interruption value where the stator windings are in the second wire connected state.

4. The electric motor drive device according to claim 1, wherein the inverter includes
an inverter circuit to generate power to be supplied to the electric motor, and
a deactivation circuit to receive a deactivation signal as input signal and deactivate the inverter circuit.

5. An air conditioner comprising:
the electric motor drive device according to claim 1; and
an electric motor driven by the electric motor drive device.

6. An electric motor drive device comprising:
a switching circuit to switch a wire connected state of stator windings of an electric motor to either a first wire connected state or a second wire connected state;
an inverter to drive the electric motor;
a power-supply voltage detection circuit to detect a first power-supply voltage that is a power-supply voltage of the switching circuit, and to deactivate the inverter when the first power-supply voltage is decreased below a threshold;
a first voltage converter to convert an AC voltage supplied from an AC power supply to a DC voltage and generate a power-supply voltage of the inverter; and
a second voltage converter to convert the power-supply voltage of the inverter to a different voltage level to generate the first power-supply voltage.

7. The electric motor drive device according to claim 6, wherein the inverter includes
an inverter circuit to generate power to be supplied to the electric motor, and
a deactivation circuit to receive a deactivation signal as input signal and deactivate the inverter circuit.

8. An air conditioner comprising:
the electric motor drive device according to claim 6; and
an electric motor driven by the electric motor drive device.

* * * * *